United States Patent
Schnaibel et al.

[11] Patent Number: 5,860,277
[45] Date of Patent: Jan. 19, 1999

[54] METHOD FOR MONITORING THE OPERATING CAPABILITY OF A CATALYZER IN THE EXHAUST DUCT OF AN INTERNAL COMBUSTION ENGINE

[75] Inventors: Eberhard Schnaibel, Hemmingen; Erich Schneider, Kirchheim; Frank Blischke, Hildesheim, all of Germany

[73] Assignee: Robert Bosch GmbH, Stuttgart, Germany

[21] Appl. No.: 468,699

[22] Filed: Jun. 6, 1995

[30] Foreign Application Priority Data

Jul. 22, 1994 [DE] Germany .......................... 44 26 020.2

[51] Int. Cl.$^6$ ....................................................... F01N 3/20
[52] U.S. Cl. .................................. 60/274; 60/276; 60/277
[58] Field of Search ............................... 60/274, 276, 277

[56] References Cited

U.S. PATENT DOCUMENTS

| | | |
|---|---|---|
| 3,882,451 | 5/1975 | Fujishiro et al. . |
| 4,656,829 | 4/1987 | Creps ........................................ 60/277 |
| 5,303,168 | 4/1994 | Cullen ...................................... 123/425 |
| 5,431,011 | 7/1995 | Casarella ................................... 60/277 |
| 5,526,643 | 6/1996 | Mukaihira ................................. 60/277 |
| 5,600,948 | 2/1997 | Nakajima ................................. 60/277 |

FOREIGN PATENT DOCUMENTS

P 23 46 425.7  4/1974  Germany .

Primary Examiner—Douglas Hart
Attorney, Agent, or Firm—Kenyon & Kenyon

[57] ABSTRACT

In a method and apparatus for monitoring the operating capability of a catalyzer in the exhaust duct of an internal combustion engine, the operating capability of the catalyzer is assessed on the basis of the increase in temperature produced by the exothermic conversion of the exhaust gases in the catalyzer. The increase in temperature is determined with the aid of two temperature signals, the first temperature signal being produced on the basis of a measurement downstream of the catalyzer and the second temperature signal being formed with the aid of a temperature model. The temperature model may form the temperature downstream of a completely inoperational catalyzer, a catalyzer which is still just sufficiently operational, or a catalyzer which is fully operational. The assessment of the operating capability of the catalyzer is performed on the basis of criteria which are matched to the temperature model used.

15 Claims, 3 Drawing Sheets

METHOD FOR MONITORING THE OPERATING CAPABILITY OF A CATALYZER IN THE EXHAUST DUCT OF AN INTERNAL COMBUSTION ENGINE

FIELD OF THE INVENTION

The present invention relates to a method for monitoring the operating capability of a catalyzer in the exhaust duct of an internal combustion engine, and to an apparatus for carrying out the method.

BACKGROUND INFORMATION

Modern motor vehicles are generally equipped with a catalyzer (catalytic converter) through which the exhaust gas from the internal combustion engine flows and which promotes chemical reactions between the exhaust-gas constituents which lead to the conversion of noxious exhaust-gas constituents into less harmful substances. However, the operating capability of the catalyzer decreases with increasing time in operation and, after a certain time in use, the catalyzer is no longer capable of reducing the exhaust emissions from the internal combustion engine to a sufficiently low level and must therefore be replaced. The time in operation after which replacement is required is heavily dependent on the conditions under which the catalyzer has to operate and cannot be predicted accurately. A catalyzer ages very rapidly, for example, when it is operated at very high temperatures. Moreover, if the quality of the fuel is poor or leaded fuel is used, the catalyzer may be subject to chemical poisoning, rendering the catalyzer completely or partially ineffective. In order to ensure low pollutant emissions over the entire life of the motor vehicle, the operating capability of the catalyzer should be monitored.

To assess the operating capability of the catalyzer, use can be made of the fact that heat is released in the conversion of the exhaust-gas constituents in the i catalyzer, giving rise to an increase in temperature. Owing to a high conversion rate, a fully operational catalyzer exhibits a large increase in temperature, i.e. the exhaust gas has a higher temperature at the outlet of the catalyzer than at the inlet of the catalyzer. The more limited the operating capability of the catalyzer, the lower is the increase in temperature.

German Patent Application No. DE 23 46 425 (corresponding to U.S. Pat. No. 3,882,451) describes a procedure in which the temperature at the outlet and at the inlet of the catalyzer is measured and the operating capability of the catalyzer is inferred from the temperature difference. If the temperature difference is too small, an alarm device is activated to indicate that the catalyzer should be replaced.

SUMMARY OF THE INVENTION

The present invention has the advantage that, of two temperature signals required to assess the operating capability of the catalyzer, only the first temperature signal has to be produced on the basis of a measurement. The second temperature signal is determined with the aid of a temperature model. It is particularly advantageous here that the measured temperature signal and the temperature signal determined by means of the temperature model are calibrated with respect to one another in a specifiable operating condition of the internal combustion engine. The calibration between the two temperature signals takes place, in particular, when the gas flow rate through the internal combustion engine is high since the increase in temperature caused by the exothermic conversion is then relatively small.

The operating capability of the catalyzer is assessed in at least one specifiable operating condition of the internal combustion engine, in particular when the gas flow rate through the internal combustion engine is low, since the increase in temperature caused by the exothermic conversion is then relatively high and is thus easy to measure.

In a preferred exemplary embodiment, the temperature model simulates the temperature downstream of a completely inoperational catalyzer. The catalyzer is judged to be sufficiently operational if a signal dependent on the difference between the first temperature signal and the second temperature signal exceeds a threshold value.

In a further advantageous exemplary embodiment, a temperature model simulates the temperature downstream of a catalyzer which is just sufficiently operational. The catalyzer is judged to be sufficiently operational if a signal dependent on the first temperature signal exceeds a signal dependent on the second temperature signal.

Finally, there is another exemplary embodiment in which the temperature model simulates the temperature downstream of a fully operational catalyzer. The catalyzer is judged to be sufficiently operational if a signal dependent on the difference between the second temperature signal and the first temperature signal falls below a threshold value.

A further advantage of the present invention is that already existing signals can be used to indicate the gas flow rate through the internal combustion engine. It is, for example, possible to use a signal which is produced on the basis of the output from an air flow meter or an air mass meter, or a signal which depends on the load and the speed of the internal combustion engine.

DETAILED DESCRIPTION

Figure 1:
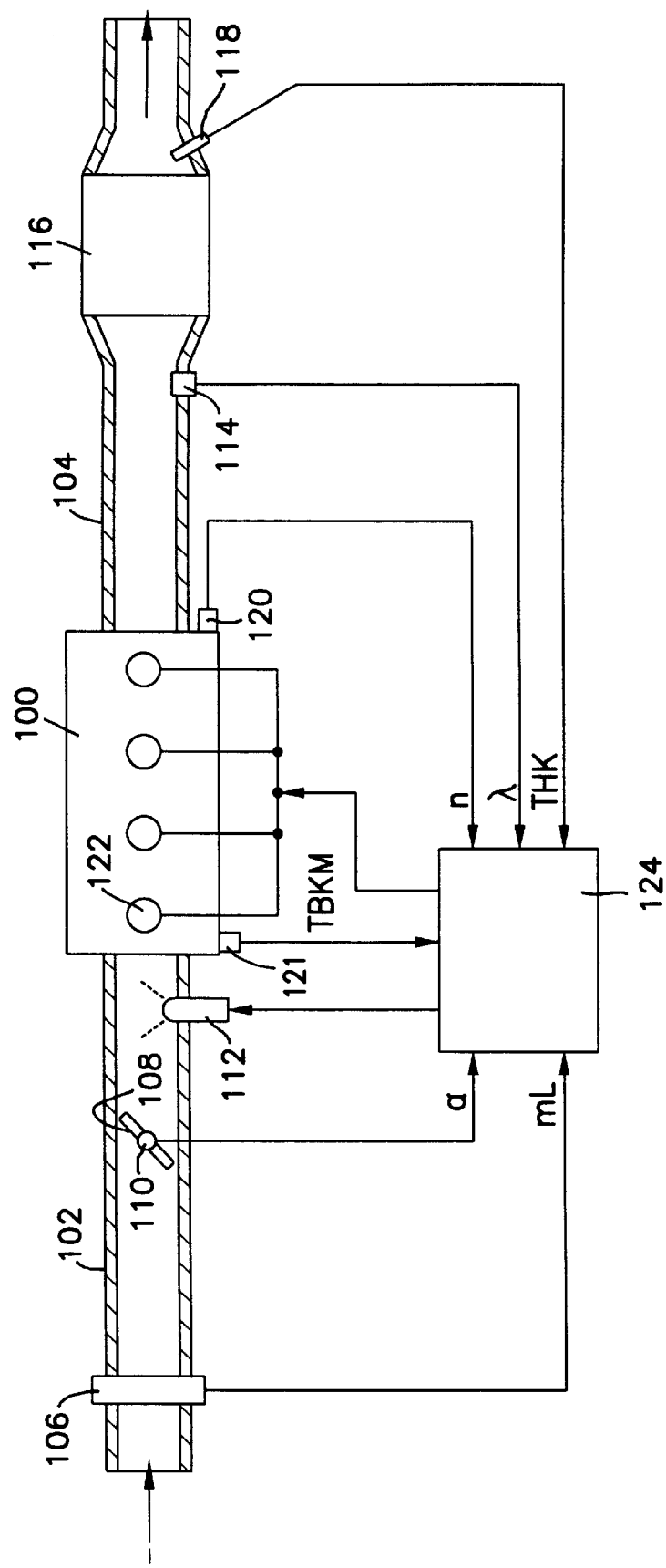
FIG. 1 shows a schematic representation of an internal combustion engine with a catalyzer.

FIG. 1 shows an internal combustion engine 100 which is supplied via an intake tract 102 with an air/fuel mixture. Exhaust gases from the engine 100 are expelled into an exhaust duct 104. The following are fitted in the intake tract 102, taken in the direction of flow of the air drawn in: an air flow meter or air mass meter 106, a hot-film air mass meter for example, a throttle valve 108 with a sensor 110 for recording the opening angle of the throttle value 108, and at least one injection nozzle 112. The following are arranged in the exhaust duct 104, taken in the direction of flow of the exhaust gas: an exhaust-gas probe 114 and a catalyzer 116 (the exhaust-gas probe 114 may instead be arranged downstream of the catalyzer 116). A temperature sensor 118 is fitted at the outlet of the catalyzer 116.

An engine-speed sensor 120 and a temperature sensor 121 are fitted on the internal combustion engine 100. The internal combustion engine 100 furthermore has four spark plugs 122, to ignite the air/fuel mixture in the cylinders. The output signals mL of the air flow meter or air mass meter 106, a of the sensor 110 for recording the opening angle of the throttle valve 108, A of the exhaust-gas probe 114, THK of the temperature sensor 118, n of the engine-speed sensor 120, and TBRM of the temperature sensor 121 are fed to a central control unit 124 by way of corresponding connecting lines. The control unit 124 evaluates the sensor signals and, via further connecting lines, activates the injection nozzle or injection nozzles 112 and the spark plugs 122. The control unit 124 also carries out the method according to the present invention for monitoring the operating capability of the catalyzer 116.

Figure 2:
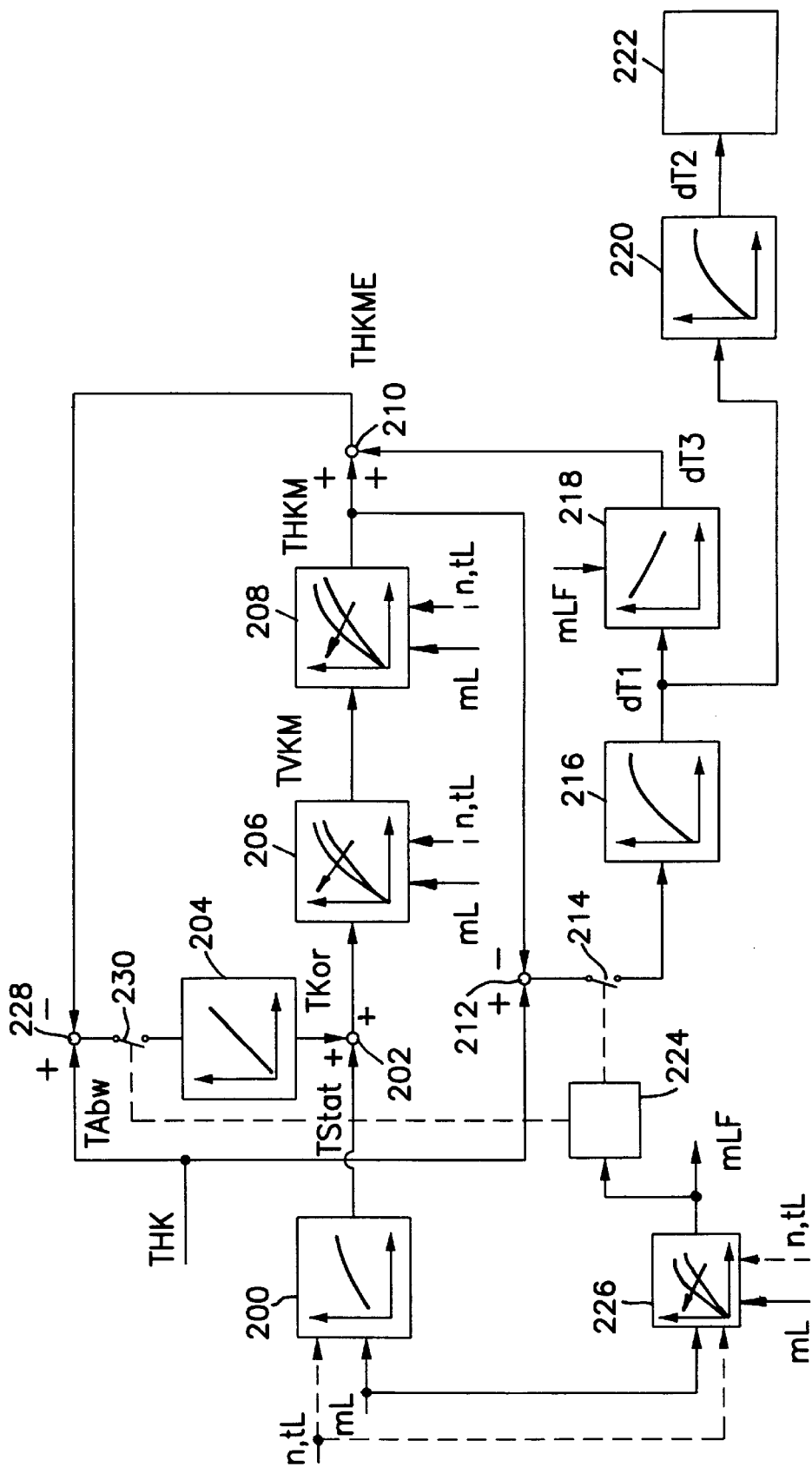
FIG. 2 shows a block diagram of an apparatus according to the present invention.

FIG. 2 shows a block diagram of the apparatus according to the present invention. From the gas flow rate through the internal combustion engine 100, a block 200 determines a signal TStat for the steady-state exhaust-gas temperature and makes this signal TStat available at its output. The required information on the gas flow rate is fed to the block 200 in the form, for example, of a signal mL for the air mass flow, this signal being produced by the air mass meter or air flow meter 106 shown in FIG. 1. The block 200 can then be configured as a characteristic which, from the signal mL, produces the signal TStat. As an alternative to the signal mL, it is also possible for the signals n for the speed of the internal combustion engine 100 and tL for the load to be fed intQ the block 200. In this case, the block 200 can be configured as a characteristic mass which determines the signal TStat from the signals n and tL. For the signal tL, it is possible to use any of the usual load signals, for example the opening angle a of the throttle valve 108 or the pressure in the intake tract 102, which can be recorded with the aid of a pressure sensor, for example.

The output of the block 200, at which the signal TStat is present, is connected to a first input of a combination point 202. The output signal TRor of a correction block 204 is present at the second input of the combination point 202. The correction block 204 serves to carry out a calibration between the temperature model and the temperature sensor 118. Details of this are described further below. The combination point 202 combines the signal TStat with the signal TRor and makes the result of the combination available at its output. The output of the combination point 202 is connected to one input of a block 206, which simulates the dynamics of the exhaust-gas temperature. Block 206 can be configured as a filter, for example a low-pass filter.

The response characteristic of block 206 can be influenced as a function of the gas flow rate through the internal combustion engine 100. For this purpose, the signal mL for the air mass flow is fed into another input of block 206, or the signals n for the engine speed and tL for the load are fed in. If block 206 is constructed as a lowpass filter, the response characteristic is influenced by appropriate modification of the time constant. In a preferred variation of the present invention, the exhaust-gas temperature is split into a fast component and a slow component which have different time responses and are further processed separately and then superposed again to form one signal. Details regarding the separation, separate further processing and subsequent superposition are described, for example, in German Patent Application No. DE 44 24 811.

At the output of block 206, a signal TVKM is made available which indicates the temperature directly upstream of the catalyzer 116. The output of block 206 is connected to one input of a block 208 which simulates the temperature response of the catalyzer 116, it being assumed that no heat of conversion is released in the catalyzer 116. Like that of block 206, the response characteristic of block 208 can be influenced as a function of the gas flow rate through the internal combustion engine 100. The signals required for this purpose, the signal mL and the signals n and tL, are fed in via another input of block 208. Block 208 can be constructed as a filter, in particular as a low-pass filter. At the output of block 208 there is a signal THKM which indicates the temperature directly downstream of the catalyzer 116, in particular for the case where no heat of conversion is released in the catalyzer 116, i.e. where the catalyzer is completely inoperational.

The signal THKM is fed into two combination points, more specifically into a first input of a combination point 210 and a first input of a combination point 212. The signal THK, which is produced by the temperature sensor 118, is present at the second input of combination point 212. Combination point 212 forms the difference of the signals THK and THKM, i.e. of the temperature downstream of the catalyzer 116 measured by means of the temperature sensor 118 and the temperature at the same location formed for an inoperational catalyzer by means of the temperature model. The result of the difference formation is made available as a signal dT at the output of combination point 212. This output is connected by way of a switch 214 to the input of a block 216.

Block 216 damps brief fluctuations in the signal dT for the temperature difference. This yields a signal dT1 which can be picked off at the output of block 216. Block 216 can be configured as a filter, for example as a low-pass filter. The output of block 216 is connected to the input of a block 218 and the input of a block 220.

In block 218 allowance is made for the fact that the heat released during the conversion in the catalyzer 116 results in an increase in temperature which differs depending on how high the gas flow rate is through the catalyzer 116 and hence through the internal combustion engine 100. The higher the gas flow rate, the smaller is the signal dT3 output by block 218 for the same input signal dt1. The information on the gas flow rate is communicated to block 218 via another input in the form of a signal mLF, the signal mLF being produced from the signal mL or from the signals n and tL by filtering.

In block 220, damping of the brief fluctuations in the signal dT1 takes place. Since the signal dT1 already represents a damped signal, the signal dT2 output by block 220 has a very smooth shape. The signal dT2 represents the difference, free from brief disturbing influences, of the signals THK (temperature measured downstream of the catalyzer 116) and THKM (temperature downstream of the catalyzer 116 determined by means of the temperature model). Since the signal THK includes the increase in temperature due to the exothermic conversion in the catalyzer 116 and the signal THKM does not include this increase in temperature, the difference between the two signals represents just the increase in temperature itself.

The operating capability of the catalyzer 116 can be determined from the increase in temperature caused by the exothermic conversion. For this purpose, signal dT2 is passed to an evaluation block 222 and is there compared to at least one threshold value. If the threshold value is exceeded, the operating capability of the catalyzer 116 is judged to be sufficient but if, on the other hand, it is undershot, the operating capability is no longer sufficient and the catalyzer 116 should be replaced. As an alternative, it is also possible in evaluation block 222 for a check to be made as to whether the signal dT2 is within a specifiable range.

In order to ensure as reliable an assessment of the operating capability of the catalyzer 116 as possible, the signal dT2 freed from brief disturbing influences is used, as already mentioned above. The switch 214 is moreover used to ensure that the increase in temperature caused by the exothermic conversion in the catalyzer 116 is used only to assess the catalyzer 116 at a low gas flow rate. At a low gas flow rate, the exothermic conversion in the catalyzer 116 leads to a particularly large increase in temperature which can be detected very easily. The switch 214 is activated by a control stage 224. The control stage 224 drives the switch 214 into a closed state in the case of a low gas flow rate—generally 15 to 25 kilograms per hour—and into an opened state at a higher gas flow rate. The filtered signal mLF for the air mass flow is present at the input of the control stage 224.

The signal mLF is produced by a block 226, either from the signal mL or from the signals n and tL. Block 226 can be configured as a filter, for example a low-pass filter. The response characteristic of block 226 can be influenced as a function of the gas flow rate, either the signal mL or the signals n and tL being fed into block 226 via another input as the signal for the gas flow rate.

In the block diagram of FIG. 2, another measure for the purpose of giving as reliable as possible an assessment of the operating capability of the catalyzer 116 is provided. This further measure is based on the consideration that the two signals THK and THKM required for the assessment can be subject to error. It therefore seems sensible to carry out a calibration between the signals THK and THKM. In this calibration, allowance should be made for the fact that the increase in temperature due to the exothermic conversion in the catalyzer 116 is included only in signal THK, not, however, in N signal THKM. In combination point 210, the first input of which is connected to the output of block 208 and the second input of which is connected to the output of block 218, the signal THKM therefore having superposed on it a signal dT3 which indicates the increase in temperature i due to the exothermic conversion in the catalyzer 116. The signal THKME produced in this way is made available at the output of block 210.

The output of block 210 is connected to a first input of a combination point 228, at the second input of which the signal THK is present. The difference, formed by the combination point, between the two input signals is fed via a switch 230 to the input of the correction block 204. The correction block 204 produces from this the correction signal TKor, which is combined in combination point 202 with the signal TStat for the steady-state exhaust-gas temperature, i.e. the calibration between the temperature sensor 118 and the temperature model takes place by correction of the signal TStat by the signal TKor.

The activation of the switch 230 provides another measure for increasing reliability in the assessment of the operating capability of the catalyzer 116. Activation is performed by the control stage 224. At a high gas flow rate, generally about 40 to 90 kilograms per hour, the control stage 224 drives the switch 230 into a closed position, thus connecting the output of combination point 228 to the input of the correction block 204. If, however, the gas flow rate is lower, the control stage 224 drives the switch 230 into an open position and thus interrupts the connection between the output of combination point 228 and the input of the correction block 204. As a result of the activation described here, the correction value output by the correction block 204 is only ever determined at a high gas flow rate, i.e. in an operating range in which the increase in temperature due to the exothermic conversion in the catalyzer is comparatively small. As a result, also, errors which occur in the determination of the increase in temperature do not have a particularly great effect on the calibration.

In summary, it can be stated that a calibration between the temperature sensor 118 and the temperature model takes place at a high gas flow rate through the internal combustion engine 100 and that an assessment of the operating capability of the catalyzer 116 using the temperature sensor 118 and the temperature model is carried out at a low gas flow rate.

Figure 3:
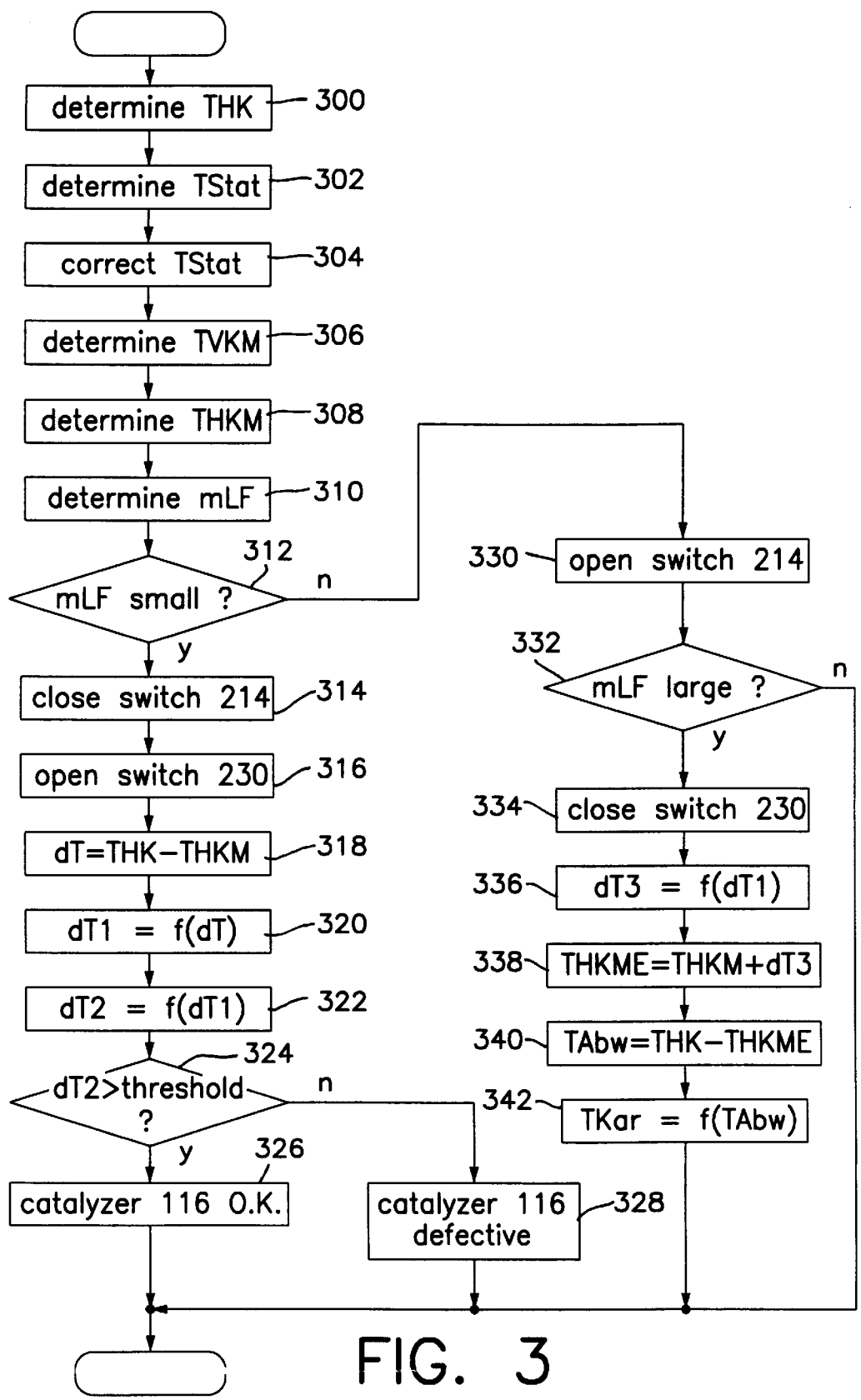
FIG. 3 shows a flow diagram to illustrate the method according to the present invention.

FIG. 3 shows a flow diagram of the method according to the present invention. In a first step 300, the temperature sensor 118 is used to form the signal THK for the temperature directly downstream of the catalyzer 118. In the following step 302, the signal TStat for the steady-state exhaust-gas temperature is determined by means of block 200 from FIG. 2. The signal TStat is then combined in step 304 with the correction value TRor in order to calibrate the temperature model and the temperature sensor 118. This calibration is performed by means of combination point 202. There follows a step 306, in which the signal TVKM for the temperature immediately upstream of the catalyzer 116 is produced from the corrected signal for the steady-state exhaust-gas temperature by means of block 206. In the following step 308, a signal THKM for the temperature immediately downstream of the catalyzer 116 is determined from the signal TVKM by means of block 208, assuming that no exothermic conversion takes place in the catalyzer 116. In the following step 310, the signal mLF for the filtered air mass flow rate is determined by means of block 226.

Step 310 is followed by an interrogation 312 as to whether the signal mLF is within a specifiable range. The specifiable range is at low mass flow rates, typically about 15 to 25 kilograms per hour. If the interrogation 312 is fulfilled, i.e. mLF is within the range, a series of steps are carried out to determine the increase in temperature due to the exothermic conversion of the exhaust gases in the catalyzer 116 and, on the basis of this increase in temperature, to assess the operating capability of the catalyzer 116. In this process, the switch 214 is first of all closed in step 314 in order to activate the corresponding area of the block diagram in FIG. 2. In the following step 316, the switch 230 is then opened in order to prevent the correction value TKor required for the calibration between the temperature model and the temperature sensor 118 from being formed again. The formation of new values for TKor should take place only at a high air mass flow rate.

Step 316 is followed by a step 318 for the formation of a signal dT representing the difference of the signal THK, which indicates the temperature immediately downstream of the catalyzer 116 determined by the temperature sensor 118, and the signal THKM, which indicates the temperature at the same location determined by the temperature model. In the following step 320, brief fluctuations in the signal dT are filtered out or damped by means of block 216 and in this way a signal dT1 is produced. In step 322, the signal dT1 is filtered or damped again, by means of block 220, and in this way produces a signal dT2.

Step 322 is followed by an interrogation 324. The interrogation 324 serves to determine, by comparison of the signal dT1 with at least one threshold value, whether the catalyzer 116 is impaired in its operating capability. The interrogation 324 can, for example, be configured in such a way that the interrogation is whether the signal dT2 is greater than a threshold value. If this is the case, step 326 follows, in which it is recorded that the catalyzer 116 is sufficiently operational. If, on the other hand, the signal dT2 is not greater than the threshold value, the interrogation 324 is followed by a step 328 in which it is recorded that the catalyzer 116 is not sufficiently operational. The method then begins again at step 300.

If the interrogation of step 312 is not fulfilled, i.e. the signal mLF for the filtered air mass flow rate is outside the specifiable range, the interrogation 312 is followed by step 330. In step 330, the switch 214 is opened since the existing operating condition of the internal combustion engine 100 is not suitable for the collection of new data for the assessment of the operating capability of the catalyzer 116.

Step 330 is followed by an interrogation 332 as to whether the signal mLF is within another specifiable range. This other range is located at high values for the air mass flow rate, for example at about 40 to 90 kilograms per hour. If the interrogation 332 is fulfilled, i.e. if such a high air mass flow rate is present, a series of steps is carried out in order to calibrate the temperature model to the temperature sensor 118. For this purpose, the switch 230 is first of all closed in a step 334 in order to permit the determination of new values for the temperature correction TKor by means of block 204.

In the following step 336, a signal dT3 is determined by means of block 218 from the last signal dT1 determined for the increase in temperature, the signal dT3 being determined by reducing the signal dT1 as a function of the gas flow rate through the catalyzer 116, represented by the signal mLF. In the following step 338, the signal dT3 formed is combined with the signal THKM and, in this way, the signal THKME is formed, which indicates the temperature immediately downstream of the catalyzer 116 determined by means of the temperature model, and, in particular, allowing for the exothermic conversion in the catalyzer 116. If the temperature model and the temperature sensor 118 are optimally calibrated to one another, the signal THKME determined in this way corresponds exactly to the signal THK emitted by the temperature sensor 118. Step 338 is followed by a step 340. In step 340, the difference of the signals THK and THKME is formed. This operation takes place in combination point 228. The result is a signal TAbw from which, in the following step 342, the correction value TRor for the correction of the signal TStat for the steady-state exhaust-gas temperature is determined by means of block 204. The flow diagram ends with step 342 and begins again at step 300.

The method according to the present invention can also be modified by performing the assessment of the operating capability of the catalyzer 116 by means of a comparison of the temperature measured downstream of the catalyzer 116 and a temperature which is determined by means of a model for the same location allowing for the increase in temperature due to the exothermic conversion. In the temperature model used here, allowance can be made either for the increase in temperature of a fully operational catalyzer 116 or the increase in temperature of a catalyzer 116 which is still just sufficiently operational. In the first case, the catalyzer 116 is judged to be sufficiently operational if the difference between the measured temperature and the model temperature is below a threshold value. In the second case, the catalyzer 116 is judged to be sufficiently operational if the measured temperature is above the model temperature.

The present invention can be used both to assess the operating capability of a primary catalyzer and that of a main catalyzer.

In one exemplary embodiment of the present invention, the temperature sensor 118 can be dispensed with. The signal THK for the temperature measured downstream of the catalyzer 116 is then produced by means of an exhaust-gas probe which is arranged downstream of the catalyzer 116. For this purpose, the temperature-dependent internal resistance of the exhaust-gas probe can be recorded, for example. If the exhaust-probe is fitted with a heating element for the electrical heating of the exhaust-gas probe, the temperature-dependent resistance of the heating element can also be used to produce the signal THK.

In another exemplary embodiment, the temperature sensor 118 can also be integrated in an exhaust-gas probe arranged downstream of the catalyzer 116.

What is claimed is:

1. A method for monitoring an operating capability of a catalyzer in an exhaust duct of an internal combustion engine, comprising the steps of:

measuring a temperature of exhaust gas in the exhaust duct downstream of the catalyzer;

producing a first temperature signal as a function of the measured temperature;

producing a second temperature signal using a temperature model;

calibrating the first and second temperature signals with respect to one another in at least one preselected operating condition of the engine; and determining the operating capability of the catalyzer as a function of the first and second temperature signals.

2. The method according to claim 1, wherein the first and second temperature signals are calibrated at a gas flow rate through the engine greater than a preselected threshold rate.

3. The method according to claim 1, wherein the operating capability of the catalyzer is determined in another preselected operating condition of the engine.

4. The method according to claim 1, wherein the operating capability of the catalyzer is determined at a gas flow rate through the engine less than a preselected threshold rate.

5. The method according to claim 1, wherein the temperature model simulates a temperature downstream of a completely inoperational catalyzer.

6. The method according to claim 5, wherein the catalyzer is determined to be operational if a difference signal dependent upon a difference between the first temperature signal and the second temperature signal is greater than a threshold value.

7. The method according to claim 1, wherein the temperature model simulates a temperature downstream of an at least partially operational catalyzer.

8. The method according to claim 7, wherein the catalyzer is determined to be operational if a first signal dependent on the first temperature signal is greater than a second signal dependent on the second. temperature signal.

9. The method according to claim 1, wherein the temperature model simulates a temperature downstream of a fully operational catalyzer..

10. The method according to claim 9, wherein the catalyzer is determined to be operational if a difference signal dependent upon a difference between the second temperature signal and the first temperature signal is less than a threshold value.

11. The method according to claim 1, wherein the operating capability of the catalyzer is determined as a further function of a rate signal indicative of a gas flow rate through the engine.

12. The method according to claim 11, wherein the rate signal is produced by one of an air flow meter and an air mass meter.

13. The method according to claim 11, wherein the rate signal depends on a load on the engine and a speed of the engine.

14. An apparatus for monitoring an operating capability of a catalyzer in an exhaust duct of an internal combustion engine, comprising:

means for measuring a temperature of exhaust gas in the exhaust duct downstream of the catalyzer and for producing a first temperature signal based thereon;

means for producing a second temperature signal based upon the temperature of exhaust gas in the exhaust duct downstream of the catalyzer using a temperature model;

means for calibrating the first and second temperature signals with respect to one another in at least one preselected operating condition of the engine; and means for determining the operating capability of the catalyzer as a function of the first and second temperature signals.

15. The apparatus according to claim 14, wherein the means for measuring includes at least one of a temperature sensor disposed in the exhaust duct downstream of the catalyzer, an exhaust-gas probe disposed in the exhaust duct, and a heating element for electrically heating the exhaust-gas probe.

* * * * *